(12) United States Patent
Zimmermann

(10) Patent No.: US 11,325,089 B2
(45) Date of Patent: May 10, 2022

(54) INFLOW BASE FOR A FLUIDIZING APPARATUS

(71) Applicant: Glatt Gesellschaft mit beschränkter Haftung, Binzen (DE)

(72) Inventor: Dirk Zimmermann, Wehr (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 0 days.

(21) Appl. No.: 16/972,114

(22) PCT Filed: May 20, 2019

(86) PCT No.: PCT/EP2019/062948
§ 371 (c)(1),
(2) Date: Dec. 4, 2020

(87) PCT Pub. No.: WO2019/233748
PCT Pub. Date: Dec. 12, 2019

(65) Prior Publication Data
US 2021/0220789 A1 Jul. 22, 2021

(30) Foreign Application Priority Data

Jun. 6, 2018 (DE) ...................... 10 2018 208 932.9

(51) Int. Cl.
| | |
|---|---|
| *B01J 8/38* | (2006.01) |
| *B01J 8/44* | (2006.01) |
| *B01J 2/16* | (2006.01) |
| *B05C 11/10* | (2006.01) |

(52) U.S. Cl.
CPC ................ *B01J 8/382* (2013.01); *B01J 2/16* (2013.01); *B01J 8/44* (2013.01); *B05C 11/1002* (2013.01); *B01J 2208/00867* (2013.01); *B01J 2208/00884* (2013.01); *B01J 2208/028* (2013.01)

(58) Field of Classification Search
CPC ....... B01J 8/382; B01J 8/38; B01J 8/44; B01J 2/16; B01J 2208/00867; B01J 2208/00876; B01J 2208/00884; B01J 2208/00938
See application file for complete search history.

(56) References Cited

U.S. PATENT DOCUMENTS

| | | | |
|---|---|---|---|
| 3,396,477 A | | 8/1968 | Nora |
| 4,542,043 A | * | 9/1985 | Abe ........................ B01J 2/006 118/303 |
| 9,472,190 B2 | | 10/2016 | Yue et al. |

(Continued)

FOREIGN PATENT DOCUMENTS

| | | |
|---|---|---|
| CH | 645036 A5 | 9/1984 |
| DE | 1667226 B2 | 10/1977 |

(Continued)

*Primary Examiner* — Lessanework Seifu
(74) *Attorney, Agent, or Firm* — The Webb Law Firm

(57) ABSTRACT

An inflow base which is permeable to process air and includes openings for the process air which flows thought the inflow base. The inflow base is arranged in the fluidizing apparatus in a manner rotatable about an axis Z of the fluidizing apparatus and subdivides this into a distribution chamber and into a vortex chamber. The inflow base of the fluidizing apparatus includes at least a first and a second inflow base plate, wherein one of the inflow base plates at its outer end includes or forms a sealing element.

7 Claims, 7 Drawing Sheets

(56) References Cited

U.S. PATENT DOCUMENTS

| | | | |
|---|---|---|---|
| 10,099,186 B2 * | 10/2018 | Dunnebier | ............ B01F 7/1675 |
| 10,132,565 B2 | 11/2018 | Jacob et al. | |
| 2011/0180157 A1 | 7/2011 | Fusejima et al. | |

FOREIGN PATENT DOCUMENTS

| | | |
|---|---|---|
| DE | 293738 A5 | 9/1991 |
| WO | 2014117577 A1 | 8/2014 |
| WO | 2014161525 A2 | 10/2014 |

* cited by examiner

INFLOW BASE FOR A FLUIDIZING APPARATUS

CROSS-REFERENCE TO RELATED APPLICATIONS

This application is the United States national phase of International Application No. PCT/EP2019/062948 filed May 20, 2019, and claims priority to German Patent Application No. 10 2018 208 932.9 filed Jun. 6, 2018, the disclosures of which are hereby incorporated by reference in their entirety.

BACKGROUND

Field

The invention relates to an inflow base which is permeable to process air and is with openings for the process air which flows through the inflow base, wherein the inflow base is arranged in the fluidizing apparatus in a manner rotatable about an axis of the fluidizing apparatus and subdivides this into a distribution chamber and into a vortex chamber.

Related Art

Inflow bases for fluidizing apparatus, in particular for classic fluidised bed apparatus have been known for some time in the state of the art. A continuously operated fluidised bed apparatus is disclosed in the two international patent applications WO 2014/161525 A2 and WO 2014/117577 A1, wherein the inflow base is rotatably arranged in the fluidised bed apparatus. Until now, it was the case that particularly with continuously operated fluidizing apparatus, the rotatable inflow base is manufactured precisely to measure, so that an annular gap which occurs between the inflow base and the outer wall of the fluidizing apparatus has a minimal gap width. This sealing mechanism which operates according to the labyrinth sealing principle is necessary, since otherwise the process air does not flow through the openings of the inflow base but through the aforementioned gap between the inflow base and the outer wall of the fluidizing apparatus.

SUMMARY

The disadvantage of the technical solutions which are represented in the state of the art is the fact that these demand an increased manufacturing effort as well as a high precision on manufacture of the individual components of the fluidizing apparatus on account of small manufacturing tolerances, in particular of the inflow base and of the outer wall of the fluidizing apparatus which is adjacent to the inflow base, without sealing the occurring annular gap to an adequate extent. Furthermore, the sealing mechanisms which have been used unit now have the disadvantage that these exhibit a very high wearing of the components.

It is therefore the object of the present invention to provide an inflow base for a fluidizing apparatus, said inflow base sealing off an annular gap between the inflow base and the outer wall of the fluidizing apparatus to an improved extent and thus overcomes the disadvantages of the state of the art.

With regard to an inflow base which is permeable to process air, this object is achieved by way of the inflow base of the fluidizing apparatus comprising at least one first and a second inflow base plate, wherein one of the inflow base plates at its outer end comprises or forms a sealing element. Advantageously, by way of the inflow base according to the invention, an optimised sealing of the annular gap between the outer end of the inflow base or an inflow base plate and an inner wall of the outer wall of the fluidizing apparatus is achieved. Furthermore, by way of the improved sealing of the annular gap, one succeeds in more process air flowing through the inflow base itself compared to the state of the art, by which means a fluidisation of the material to be treated, in particular of the particles or granulates to be treated is improved. Furthermore, on manufacture of the inflow base or of the individual inflow base plates of the inflow base, it is possible to simplify the manufacture of the individual components on account of the greater manufacturing tolerances in comparison to the conventional inflow bases of fluidizing apparatus and hence to further optimise the manufacturing procedure. Furthermore, other components, for example components which permit a simple transport of the material to be treated, into the fluidizing apparatus, can be advantageously connected to the fluidizing apparatus.

The inflow base of the fluidizing apparatus preferably comprises three inflow base plates. According to this preferred embodiment of the inflow base according to the invention, the lowermost inflow base plate which is also denoted as the sub-base of the inflow base has two functions: on the one hand the lowermost inflow base plate of the inflow base which is mostly manufactured of steel or stainless steel serves as a holder for the middle inflow base plate, i.e. the middle inflow base plate is arranged on the lower inflow base plate and is connected to this, and on the other hand the middle inflow base plate which is preferably manufactured of PTFE or a material which is similar to this is stabilised by the sub-base. The upper inflow base plate in contrast has the function of rendering the middle inflow base plate more heavy, so that this is not lifted or detached by the process air which flows through the inflow base and the process air does not flow past the inflow base plate, but the process air flows through all three inflow base plates of the inflow base according to the invention.

Particularly preferably, the sealing element is arranged or formed over a periphery on the outer end of the one inflow base plate. A sealing element which is arranged over the complete periphery of one of the inflow base plates improves the sealing of the inflow base with respect to the outer wall of the fluidizing apparatus.

According to a particularly preferred embodiment of the inflow base according to the invention, the one inflow base plate which forms a sealing element is manufactured from polytetrafluoroethylene. Polytetrafluoroethylene—also denoted as PTFE—has a very low coefficient of friction, by which means the inflow base plate which seals the annular gap between the inflow base and the outer wall of the fluidizing apparatus is only loaded to a limited extent on rotating the inflow base for operation of the fluidizing apparatus, and the wearing of the inflow base plate which forms the sealing element is low. Furthermore, the static friction is just as large or roughly as large as the dynamic friction, so that the transition from standstill of the inflow base given a standstill of the fluidizing apparatus, to the movement or rotation of the inflow base on operation of the fluidizing apparatus takes place without a "jerk", that the so-called stick-slip effect, i.e. the occurrence of juddering during the operation of the fluidizing apparatus is avoided. A very slow rotation of the inflow base in the fluidizing apparatus is also possible by way of this.

According to an additional embodiment of the inflow base according to the invention, the inflow base plates are connectable or connected to one another in an immovable manner. Advantageously, on account of this, it is not possible for the inflow base plates to mutually displace, so that a pressure loss over the inflow base, set in a precise manner by way of the inflow base plates, is and always remains equally large.

Furthermore, the openings of the individual inflow base plates of the inflow base preferably have a different passage area for the process air. On account of the differently large openings with differently large passage areas for the process air in the individual inflow base plates of the inflow base according to the invention, the pressure loss over the inflow base can be set in a very precise manner or can be very precisely adjusted. It is therefore possible to adapt the inflow base for the application in another manufacturing or treatment process in a simple and rapid manner by way of the exchange of an inflow base plate. Furthermore, by way of making do without a classic gauze or screening cloth, the perforation, i.e. the openings in the inflow base plates of the inflow base can be optimally adapted to the contour of the individual process chambers. Dead spaces in the process chambers can be significantly reduced or even avoided by way of this.

Very particularly preferably, the inflow base is or becomes useable or used for a fluidizing apparatus, wherein the fluidizing apparatus is operated in a continuous manner. Advantageously, by way of this it is ensured that the production capacity and hence the utilisation of the fluidizing apparatus is increased on account of the continuous operation

BRIEF DESCRIPTION OF THE DRAWINGS

The invention is hereinafter explained in more detail by way of the accompanying drawings. There are shown in.

DETAILED DESCRIPTION

Figure 1:
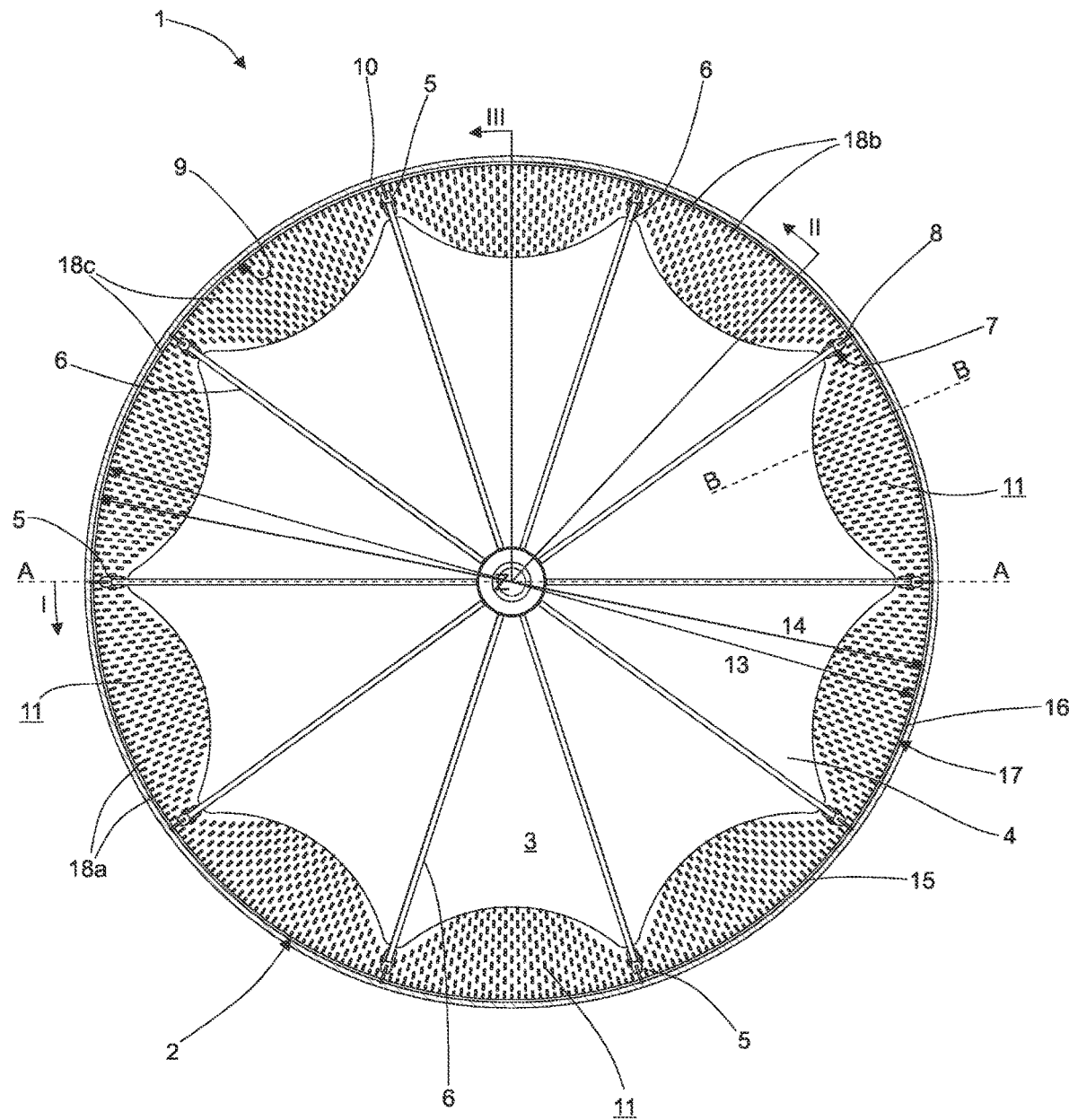
FIG. 1 a plan view of a fluidizing apparatus with an inflow base according to the invention, FIG. 2 a lateral view of a part of a fluidizing apparatus with a inflow base according to the invention, in a full section along the section axis A-A which is shown in FIG. 1, FIG. 3 a lateral view of an inflow base according to the invention which comprises three inflow base plates, in a full section along the section axis B-B which is shown in FIG. 1, FIG. 4 a plan view of a part of an upper inflow base plate of the inflow base which is shown in FIG. 3 and which comprises three inflow base plates, FIG. 5 a lower view of a part of an upper inflow base plate of the inflow base which is shown in FIG. 3 and which comprises three inflow base plates, FIG. 6 a detailed view of a fastening element which is shown in a detail X according to FIG. 2, of the inflow base according to the invention, on a displacement body and FIG. 7 a perspective representation of an inflow base of the fluidizing apparatus which comprises three inflow base plates, in a part section.

A plan view of a fluidizing apparatus 1 with an inflow base 2 according to the invention is shown in FIG. 1. The inflow base 2 subdivides the in particular continuously operated fluidizing apparatus 1 into a distribution chamber which is not shown, and which is arranged below the inflow base 2, and a vortex chamber 3 which is arranged above the inflow base 2. The inflow base 2 according to the invention comprises a displacement body 4 as well as separating walls 6 which are arranged on the displacement body 4 and are connected to the inflow base 2 by way of fastener 5. The separating walls 6 furthermore at their outer ends 7 comprise a separating wall ending 8. The separating wall ending 8 can be straight or have an arcuate shape, in particular in order to scrape away the inner wall 9 of the outer wall 10 of the fluidizing apparatus 1 and to therefore free it from caking. The separating wall ending 8 extends radially from the outer end 7 of the separating wall 6 up to the outer wall 9 of the fluidizing apparatus 1, in particular up to the inner wall 9 of the outer wall 10. The separating walls 6 extend from the inflow base 2 up to an arbitrary height in the fluidizing apparatus 1, said height being adaptable to the respective manufacturing or treatment process in the fluidizing apparatus 1. The separating walls 6 subdivide the vortex chamber 3 into process chambers 11. In the embodiment example, the fluidizing apparatus 1 comprises ten process chambers 11.

The inflow base 2 according to the invention comprises three inflow base plates 12a to 12c, wherein the lowermost inflow base plate 12c can also be denoted as a sub-base and the middle inflow base plate 12b as a sealing base. The diameter 13 of the upper and lower inflow base plate 12a and 12c is smaller compared to the diameter 14 of the middle inflow base plate 12b. The two inflow base plates 12a and 12c as a rule are formed from steel, in particular stainless steel or the like. An annular gap 15 forms between the upper and the lower inflow base plate 12a and 12c and the inner wall 9 of the outer wall 10 of the fluidizing apparatus 1.

In contrast to this, the middle inflow base plate 12b as a rule is manufactured from polytetrafluoroethylene (PTFE) or a material which is similar to this, such as for example polychlorotrifluororethylene (PCTFE) or tetrafluoroethylene perflouropolypropylene (FEP). Due to its larger diameter 14, the middle inflow base plate 12b seals the annular gap 15 between the upper and the lower inflow base plate 12a and 12c and the inner wall 10 of the outer wall 9 of the fluidizing apparatus 1. The middle inflow base plate 12b in the embodiment example itself forms a sealing element 16 which seals the annular gap 15, at the outer end 17 of the middle inflow base plate 12b. However, a sealing element 16 which is designed as a second component could for example be arranged on the middle inflow base plate 12b. As is represented in the embodiment example, what is particularly preferred is that the sealing element 16 is formed over a periphery at the outer end 17 of the middle inflow base plate 12b. A sealing element 16 which is arranged around the complete periphery of one of the inflow base plates 12b improves the sealing of the inflow base 2 with respect to the outer wall 9 of the fluidizing apparatus 1.

The polytetrafluoroethylene (PTFE) which as a rule is used for the manufacture of the middle inflow base 2 has a very low coefficient of friction, by which means the inflow base plate 12b which seals the annular gap 15 between the inflow base 2 and the inner wall 9 of the fluidizing apparatus 1 is only loaded to a limited extent on rotation of the inflow base 2 about the middle axis Z and the wearing is accordingly low. Furthermore, the static friction with PTFE is roughly just as large as the dynamic friction, so that the transition from the standstill of the inflow base 2 according to the invention given a standstill of the fluidizing apparatus 1, to the movement of the inflow base 2, takes place without a "jerk" on operation of the fluidizing apparatus 1.

The inflow base 2 which in the embodiment example comprises three inflow base plates 12a to 12c creates a pressure loss for the process air which flows through the inflow base 2. Process air denotes a gaseous medium which fluidises the materials, in particular particles or granulates, which are to be treated in the fluidizing apparatus 1. On account of the middle inflow base plate 12b which seals with respect to the outer wall 10 of the fluidizing apparatus 1 and subdivides this into a non-represented distribution chamber and a vortex chamber 3, the process air flows exclusively through openings 18 in the inflow base 2 from the distribution chamber into the vortex chamber 3. The openings 18 of the inflow base plates 12a to 12c which form the inflow base 2 have different passage areas in the embodiment example. By way of this, the pressure loss of the inflow base 2 can be set very precisely to each product which is to be manufactured.

For an improved representation of the openings 18, the inflow base 2 according to the invention is divided into three sectors I, II and III. The openings 18a of the upper inflow base plate 12a are herein shown in sector I, the openings 18b of the middle inflow base plate 18b in sector II and the openings 18c of the lower inflow base plate 12c in sector III. In the embodiment example, the passage area of the inflow base plates 12a to 12c reduces from the lower inflow base plate 12c to the upper inflow base plate 12a. By way of example, the openings 18a in the upper inflow base plate 12a are designed as very thin slots with a width of 0.2 mm. By way of this, the pressure loss is so large that a material which enters into the process chamber 11 is immediately fluidised and is hence optimally fluidised from the beginning, i.e. on entry into the fluidizing apparatus.

Figure 2:
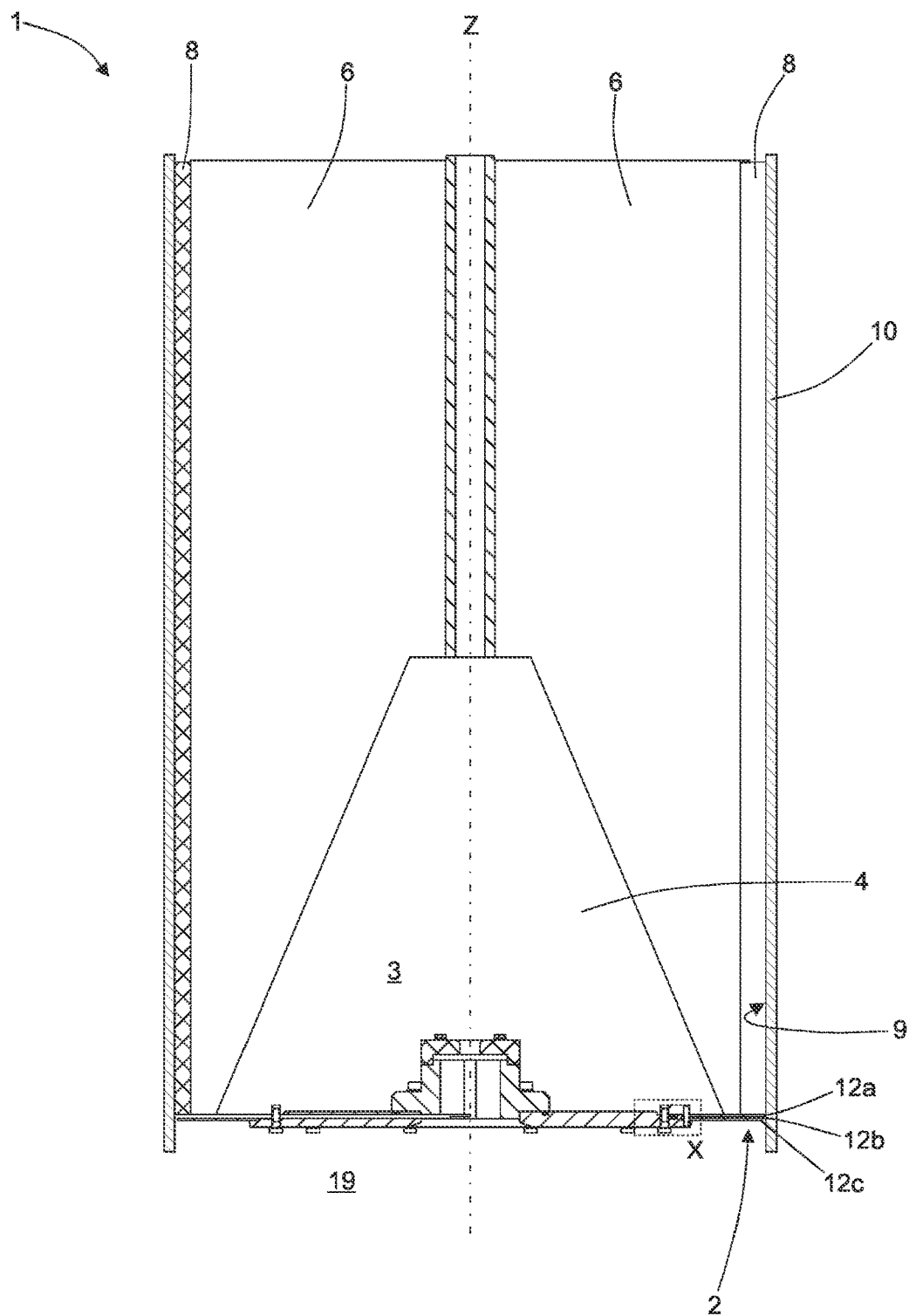

FIG. 2 represents a lateral view of a part of a fluidizing apparatus 1 with an inflow base 2 according to the invention, in a full section along the section axis A-A which is shown in FIG. 1. The fluidizing apparatus 1 is subdivided into the vortex chamber 3 and into the distribution chamber 19 by way of the inflow base 2 according to the invention. The inflow base plates 12a to 12c are arranged on the displacement body 4. A detailed view of the fastening of the inflow base plates 12a to 12c to the displacement body 4 according to the detail X is represented and explained in FIG. 6. The three inflow base plates 12a to 12c do not extend over the complete diameter 13, 14 but are connected to the displacement body 4 below this. The inflow base plates 12a to 12c are all releasably connected to one another and are arranged on the displacement body 4 in an individually exchangeable manner.

Separating walls 6 which comprise separating wall endings 8 are arranged on the displacement body 4 which rotates about a middle axis Z. The separating wall ending 8 extends from the outer end 7 of the separating wall 6 up to the inner wall 9 of the outer wall 10 of the fluidizing apparatus 1. The separating walls 6 extend from the inflow base 2 which comprises three inflow base plates 12a, over the complete height of the fluidizing apparatus 1. The process air which flows through the inflow base 2 from the distribution chamber 19 in the direction of the vortex chamber 3 is preferably cleaned by a filter which is not represented here, at the upper end of the fluidizing apparatus 1.

Figure 3:
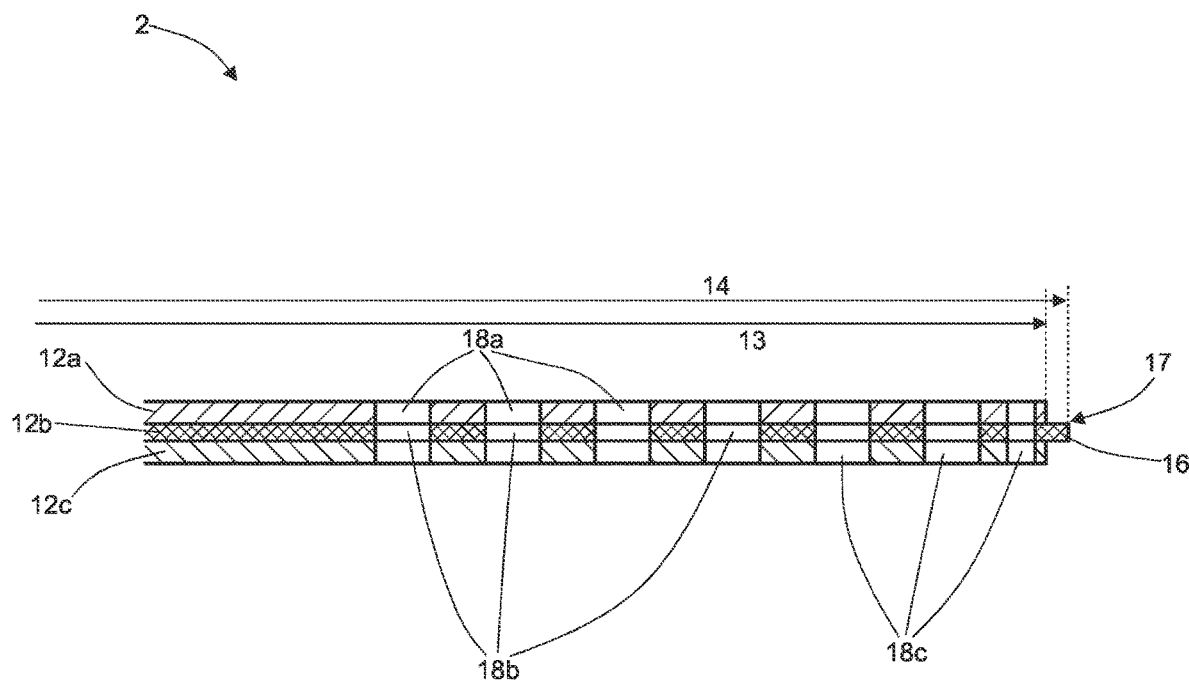
Figure 4:
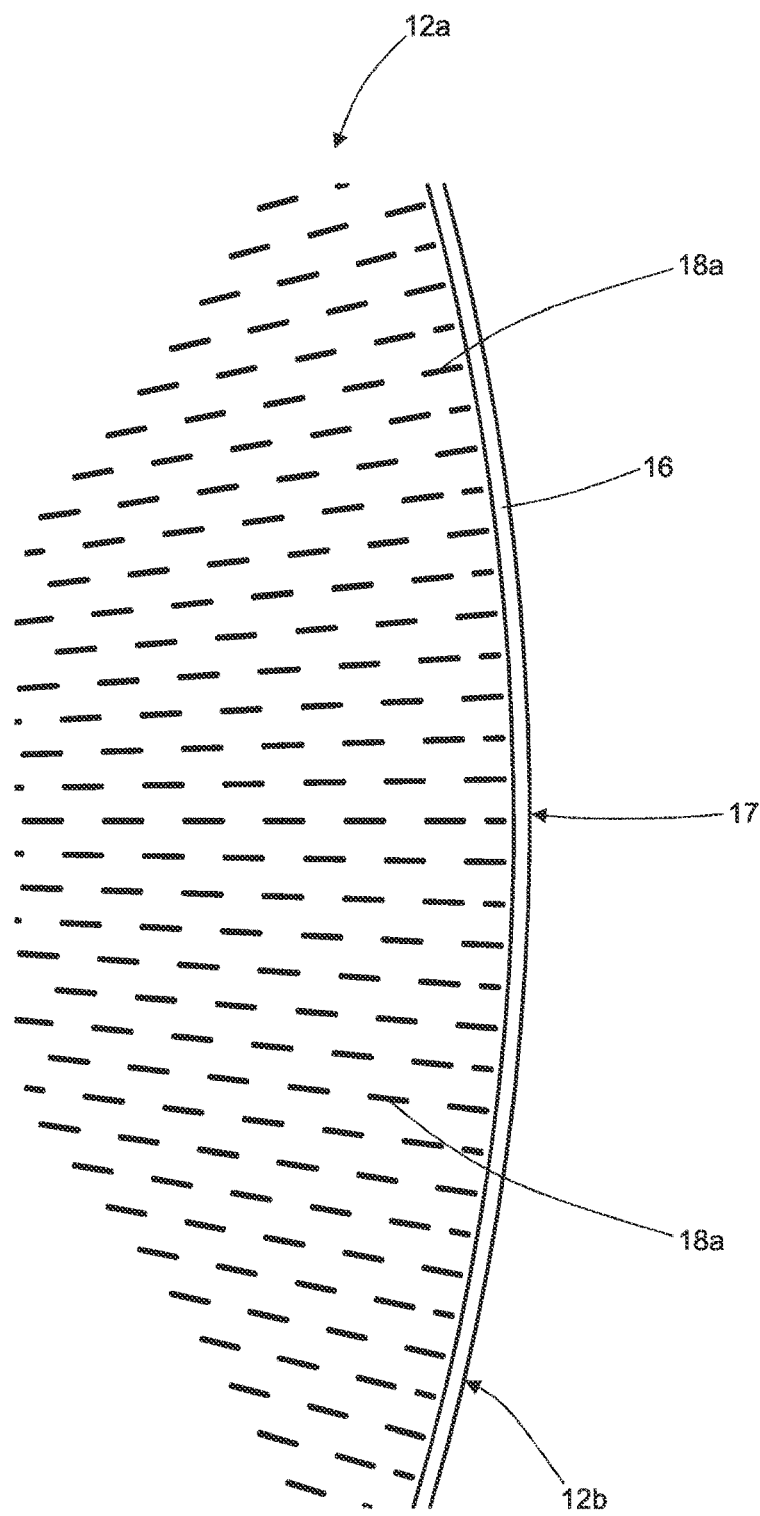

A lateral view of an inflow base 2 according to the invention which comprises three inflow base plates 12a to 12c is represented in FIG. 3 in a full section along the section axis B-B which is shown in FIG. 1. The middle inflow base plate 12b has a larger diameter 14 in comparison to the upper and the lower inflow base plate 12a and 12c. In the represented embodiment example, on account of this, the middle inflow base plate 12b at its outer end 17 forms the sealing element 16. The openings 18a to 18c of the inflow base plates 12a to 12c are arranged over one another in the embodiment example, wherein according to FIG. 1, the openings 18a of the inflow base plate 12a have a lower width in comparison to the openings 18b and 18c, which is not represented here FIG. 4 shows a plan view upon a part of the upper inflow base plate 12a of the inflow base 2 which is represented in FIG. 3 and comprises three inflow base plates 12a to 12c. The openings 18a are hereby preferably designed as slots with a width of 0.2 mm. The middle inflow base plate 12b is further represented, wherein its outer end 17 forms a sealing element 16 which seals the annular gap 15 between the inflow base 2 according to the invention and the inner wall 9 of the outer wall 10 of the fluidizing apparatus 1.

Figure 5:
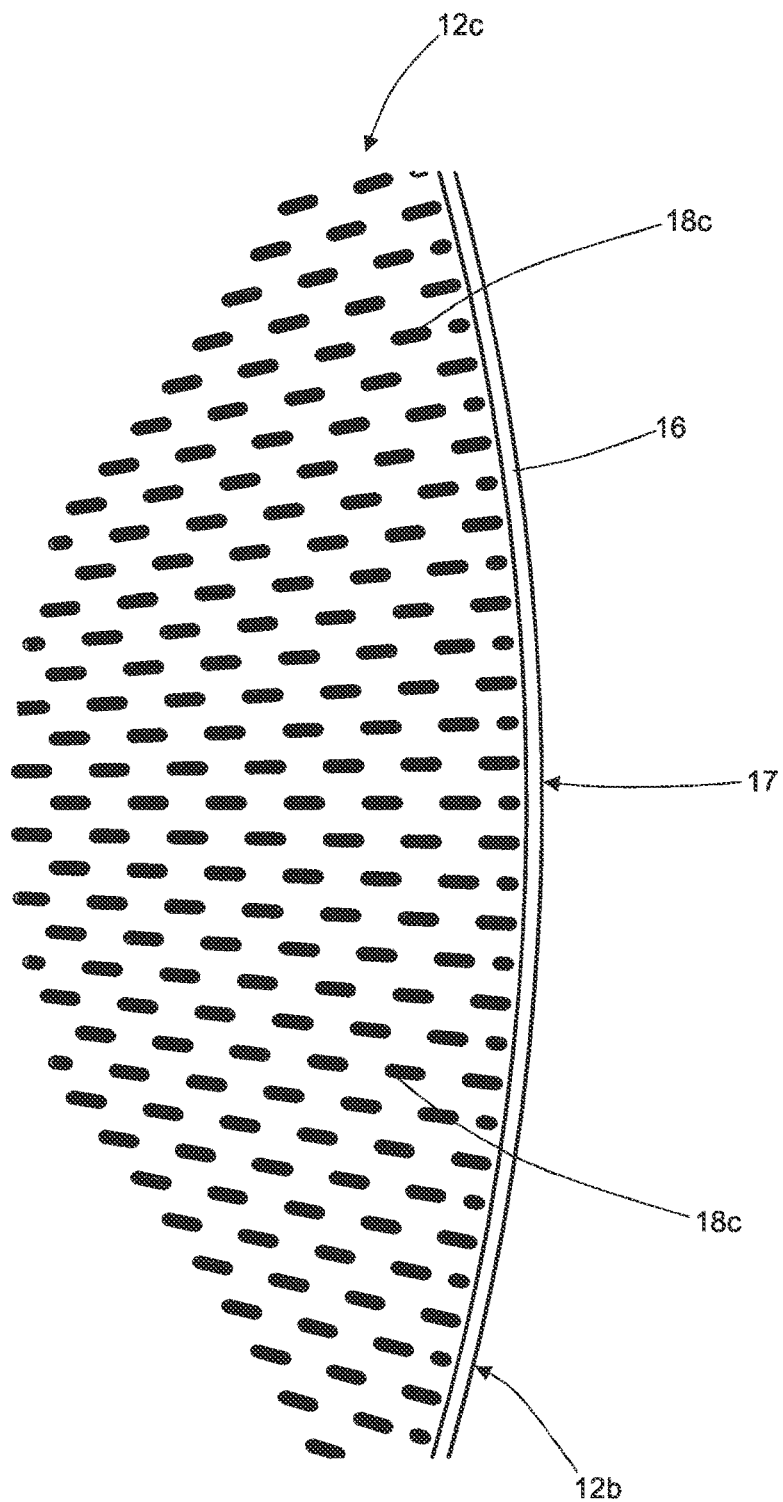

A lower view upon a part of a lower inflow base plate 12c of the inflow base 2 which is represented in FIG. 3 and which comprises three inflow base plates 12a to 12c is shown in FIG. 5. Hereby, the openings 18c are likewise preferably designed as slots, wherein the slots of the lower inflow base plate 12c are wider than the slots of the upper inflow base plate 12a, so that a passage area of the openings 16c for process air is larger than a passage area of the openings 18a. Furthermore, the middle inflow base plate 12b is represented, wherein their outer end 17 forms a sealing element 16 which seals off the annular gap 15 between the inflow base 2 according to the invention and the inner wall 9 of the outer wall 10 of the fluidizing apparatus 1.

Figure 6:
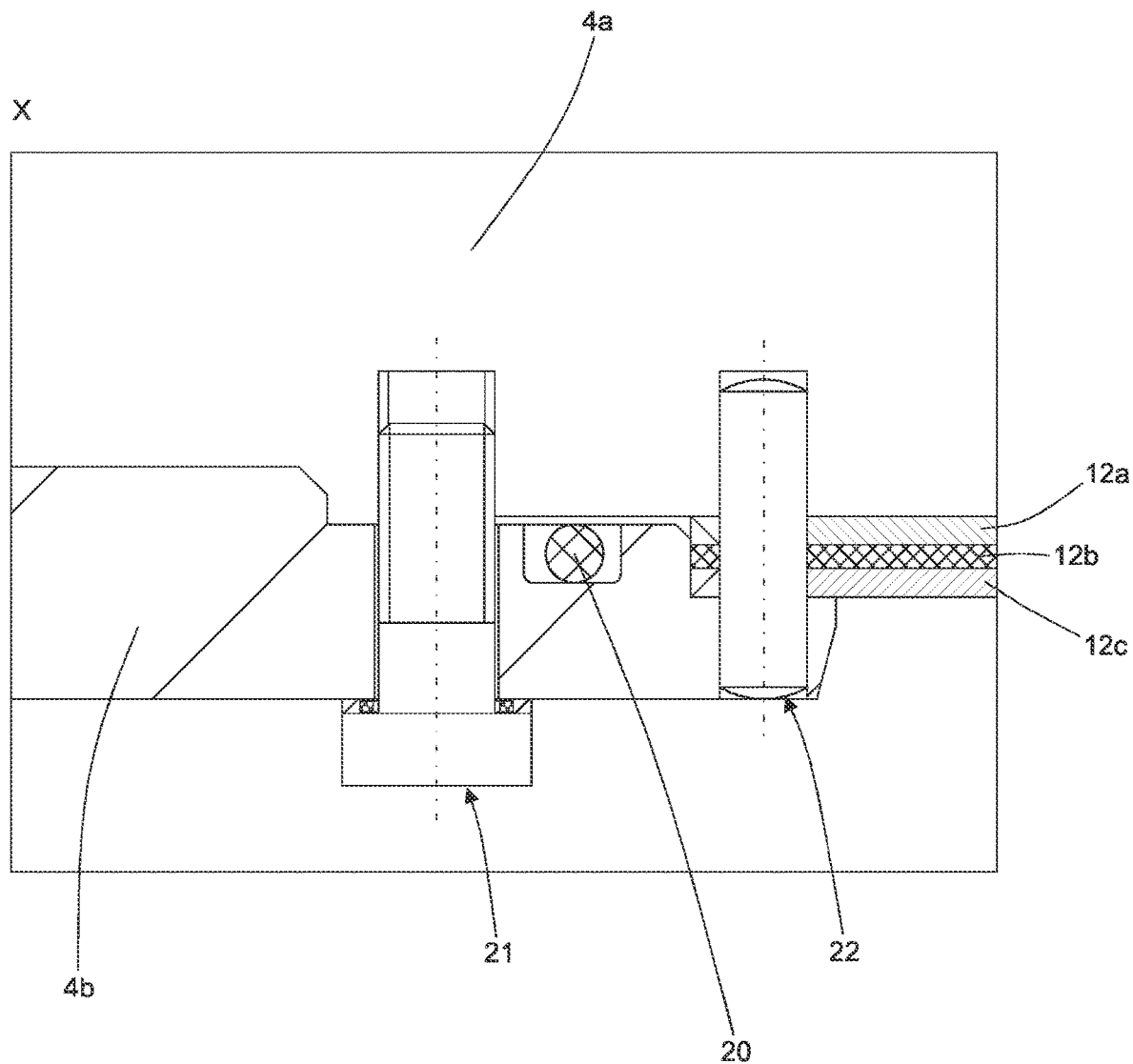

A detailed view of a fastening of the inflow base 2 according to the invention on a displacement body 4, said fastening being shown in the detail X according to FIG. 2, is shown in FIG. 6. The inflow base plates 12a to 12c between a displacement body upper part 4a and displacement body lower part 4b which is sealed to this by way of a sealing element 20, in particular an O-ring, a flat seal or the like, are fastened by way of a fastening element 21, in particular a screw or the like. The inflow base plates 12a, 12b and 12c are connected to the displacement body 4 by way of a fastening element 22, preferably a bolt or the like.

Figure 7:
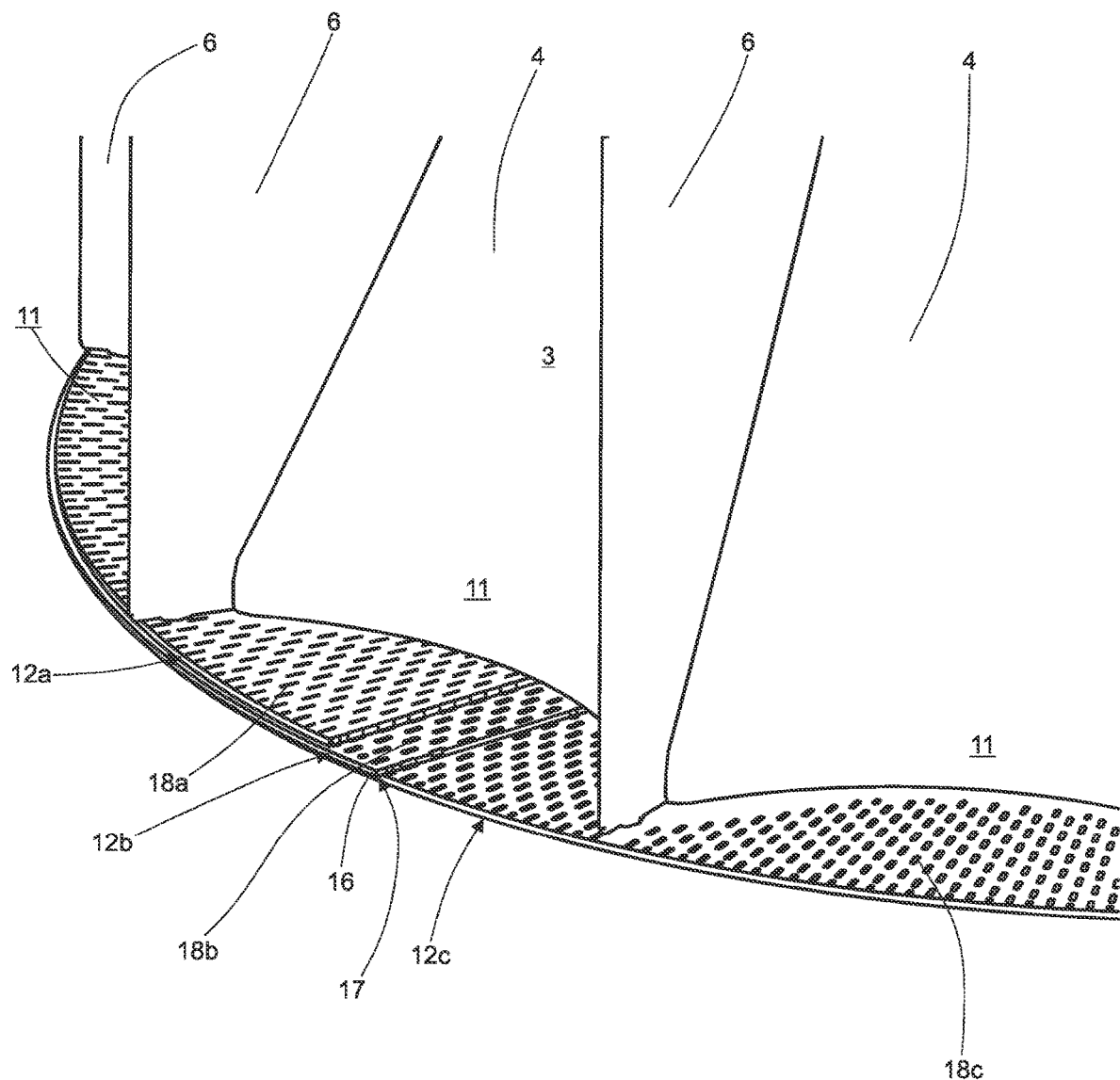

FIG. 7 represents a perspective representation of an inflow base 2 which is according to the invention and which comprises three inflow base plates 12a to 12c, of the fluidizing apparatus 1, in a part section. The inflow base 2 which comprises three inflow base plates 12a to 12c is arranged on the displacement body 4 of the fluidizing apparatus 1 which comprises separating walls 6. The vortex chamber 3 of the fluidizing apparatus 1 is subdivided into process chambers 11 by way of the separating walls 6. In FIG. 7, the three inflow base plates 12a to 12c of the inflow base 2 have not been represented throughout for a simplified representation.

The lower inflow base plate 12c has the function of holding and stabilising the middle inflow base plate 12b which is designed as a sealing base. Preferably, the lower inflow base plate 12c just as the upper inflow base plate 12a is manufactured from steel, preferably stainless steel. The inflow base plate 12b which is designed as a sealing base is preferably manufactured of polytetrafluoroethylene (PTFE) or the like. In order for the middle inflow base plate 12b to be useable as a sealing base, this must either have a larger diameter 14 in comparison to the lower and upper inflow base plate 12a and 12c respectively, or comprise a sealing element at its outer end 17, such a sealing element not being represented here. In the embodiment example, the middle inflow base plate 12b on account of its larger diameter 14 in comparison to the inflow base plates 12a and 12c itself seals the sealing element 16 at its outer end 17.

The upper inflow base plate 12a of the inflow base 2 arranged in the fluidizing apparatus 1, in the preferred embodiment which is represented in the embodiment example comprises smaller openings 18a, in particular with a slot shape with a width of 0.2 mm. The pressure loss which is produced over the inflow base 2 is set by the openings 18a to 18c of the inflow base plates 12a to 12c, in particular by the upper inflow base plate 12a. Given an optimal setting of the pressure loss which is produced over the inflow base 2, the material to be treated, in particular particles or granulate is optimally fluidised, i.e. the process air also fluidises the produced, moist granulate which enters the process chamber 11.

By way of such a design of the inflow base 2 which is arranged in the fluidizing apparatus 1, in particular by way of the middle inflow base plate 12b which is designed as a sealing base, this can be rotated in the fluidizing apparatus 1 about a middle axis Z and simultaneously can seal the distribution chamber 19 from the vortex chamber 2 as well as the inflow base 2 with respect to the inner wall 9 of the outer wall 10 of the fluidizing apparatus 1 without the occurrence of wear.

The invention claimed is:

1. An inflow base which is permeable to process air and includes openings for the process air which flows through the inflow base, wherein the inflow base is arranged in a fluidizing apparatus in a manner rotatable about an axis Z of the fluidizing apparatus and subdivides the fluidizing apparatus into a distribution chamber and into a vortex chamber, wherein the inflow base of the fluidizing apparatus comprises three inflow base plates, wherein one of the inflow base plates at its outer end comprises or forms a sealing element.

2. The inflow base according to claim 1, wherein the sealing element is arranged or formed over a periphery on the outer end of the one of the inflow base plates that comprises or forms the sealing element at its outer end.

3. The inflow base according to claim 2, wherein the one inflow base plate which forms the sealing element is manufactured from polytetrafluoroethylene.

4. The inflow base according to claim 1, wherein the inflow base is configured for use in the fluidizing apparatus that is operated in a continuous manner.

5. An inflow base which is permeable to process air and includes openings for the process air which flows through the inflow base, wherein the inflow base is arranged in a fluidizing apparatus in a manner rotatable about an axis Z of the fluidizing apparatus and subdivides the fluidizing apparatus into a distribution chamber and into a vortex chamber, wherein the inflow base of the fluidizing apparatus comprises at least a first and a second inflow base plate, wherein one of the inflow base plates at its outer end comprises or forms a sealing element, and wherein the inflow base plates are connectable or connected to one another in an immovable manner.

6. An inflow base which is permeable to process air and includes openings for the process air which flows through the inflow base, wherein the inflow base is arranged in a fluidizing apparatus in a manner rotatable about an axis Z of the fluidizing apparatus and subdivides the fluidizing apparatus into a distribution chamber and into a vortex chamber, wherein the inflow base of the fluidizing apparatus comprises at least a first and a second inflow base plate, wherein one of the inflow base plates at its outer end comprises or forms a sealing element, and wherein the first and second inflow base plates comprise openings and the openings of the inflow base plates of the inflow base have a different passage area for the process air.

7. An inflow base which is permeable to process air and includes openings for the process air which flows through the inflow base, wherein the inflow base is arranged in a fluidizing apparatus in a manner rotatable about an axis Z of the fluidizing apparatus and subdivides the fluidizing apparatus into a distribution chamber and into a vortex chamber, wherein the inflow base of the fluidizing apparatus comprises at least a first and a second inflow base plate, wherein one of the inflow base plates at its outer end comprises or forms a sealing element, and wherein each of the at least first and second inflow base plates includes openings.

* * * * *